3,112,280
NEW POLYMERIC SUBSTANCES

Alan Charles Farthing, Blackley, Manchester, England, assignor to Imperial Chemical Industries Limited, a corporation of Great Britain
No Drawing. Filed Aug. 11, 1952, Ser. No. 303,839
Claims priority, application Great Britain Aug. 22, 1951
14 Claims. (Cl. 260—2)

This invention relates to new polymeric substances.

According to the invention there are provided new polymeric substances being polymers of oxacyclobutanes.

The oxacyclobutanes, the polymers of which constitute this invention, include oxacyclobutane itself, having the formula

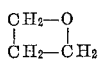

and oxacyclobutanes carrying substituents on one or more of the carbon atoms, such as compounds of the formulae

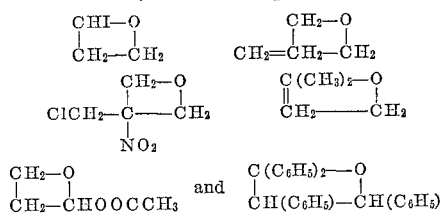

Although such axocyclobutanes are useful as starting materials for the polymeric substances of this invention, they are not readily manufactured. There is, however, one class of oxacyclobutanes that is readily obtainable from pentaerythritol and its derivatives by cyclization of the 1:3-chlorhydrins or 1:3-bromydrins by treatment with sodium or potassium hydroxide and which has the general formula

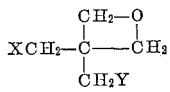

wherein X and Y stand for halogen, cyanide, hydroxyl or an organic substituent such as, in particular, an alkoxy or an acyloxy group, and it is with polymers from this class of oxacyclobutanes that this invention is especially concerned. The oxacyclobutane of the above formula wherein X and Y stand for hydrogen is similarly readily obtainable from pentaglycol chlorhydrin or bromhydrin and is also of especial interest in the present invention.

Polymerization of the oxacyclobutanes may be achieved by contacting them, preferably in the absence of water, with a Friedel-Crafts catalyst, for example boron trifluoride or its complexes such as the diethyl etherate or the acetic acid complex, or concentrated sulphuric acid, stannic chloride, aluminium chloride or gallium trichloride. Tertiary oxonium salts such as triethyl oxonium fluoborate (see Journal für praktische Chemie, 1939, volume 154, page 83) may also be used. Boron trifluoride and its complexes have been found to be particularly effective. Polymerization is exothermic and generally proceeds without the application of heat and in some cases it may be advantageous to cool the reaction mixture in order to regulate the rate of polymerization and the properties of the product, for example the molecular weight.

The polymerization may be carried out at temperatures from —80° C. to 150° C.; in order to obtain products of high molecular weight it is preferred to carry out the reaction at a constant temperature, preferably below room temperature. The temperature required depends upon the reactivity of the monomeric oxacyclobutane used which is in turn governed by the number, nature and position of the substituent groups. Thus 3:3-dimethyl-oxacyclobutane is particularly reactive and 3:3-bis-acetoxymethyl oxacyclobutane is much less reactive. The nature of the product varies with the rate of polymerization and accordingly a reaction temperature must be chosen to give an adequate rate of reaction and a suitable molecular weight; this can be done by trial. The temperature may conveniently be controlled by using as a solvent a low boiling liquid such as methyl chloride, sulphur dioxide or monofluoro dichloromethane. The molecular weight of the polymer produced may be varied by changing the concentration of monomer used. It is advantageous to remove catalyst from the product by washing with water or preferably with methanol or ethanol or a solution of ammonia in these solvents.

The polymers obtained may be linear, having a repeating unit of the formula

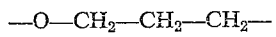

wherein any or all of the hydrogen atoms may be replaced by substituents in the manner indicated above, or, in the case where the substituents are reactive, they may be cross-linked. In the preferred instance of the use of oxacyclobutanes derived from pentaerythritol, the repeating unit has the formula:

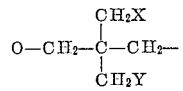

and cross-linking is controlled by the nature of the substituents X and Y. When these are hydrogen or halogen, a linear polymer is obtained. When one or both are reactive substituents such as hydroxy the polymer obtained is cross-linked and/or branched. A similar effect may be obtained by the use of 2:6-dioxaspiro-(3:3)-heptane

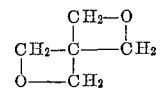

Thus when X stands for —OH and Y stands for —OH or —Cl the polymer is a hard insoluble resin. 2:6-dioxaspiro-(3:3)-heptane gives a similar product.

Further it is possible to co-polymerize mixtures of different oxacyclobutanes in varying proportions to prepare co-polymers of a wide range of properties. When co-polymers are made with two or more different oxacyclobutanes and the groups X and Y are inert, such as halogen, hydrogen, OR (R=alkyl or aryl), then the co-polymer is linear. But by use of varying amounts of oxacyclobutanes where X and/or Y are reactive the degree or extent of branching or cross-linking may be controlled, thus influencing the solubility, viscosity and other physical properties in a desirable manner. In order to obtain linear polymers from such oxacyclobutanes containing reactive substituents, it is necessary to protect the reactive groups, for example by temporary condensation with suitable reactive organic compounds. Thus the two hydroxy groups in the oxacyclobutane derived from pentaerythritol itself, namely

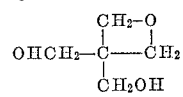

may be pretreated by condensation with acetone, and the resulting polymer having a repeating unit

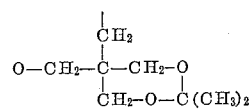

may be hydrolyzed with water and dilute acid to give the simple, linear, high molecular weight polypentaerythritol having the repeating unit

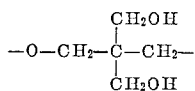

In this manner there may be obtained a linear polypentaerythritol having more than 20 repeating units in the polymer chain which is high melting and only soluble in strongly hydrogen bonding solvents such as formic acid and m-cresol giving viscous solutions. The high melting point may be due to the frequent and regular hydrogen bonds between neighbouring polymer chains (as in cellulose).

The polymers described above are valuable in that the repeating units are joined by ether linkages, which are much more stable to the hydrolytic action of aqueous mineral acids and bases than are ester or amide linkages present in some other synthetic polymers. Further on heating the polymers no interchange reactions occur such as are known to occur when polyesters or polyamides are heated above certain known temperature. Thus if a high molecular weight polyester is heated with a low molecular weight polyester then in the presence of known catalysts the product comes to an equilibrium at an average molecular weight. This is not known to occur with such polyethers as form the subject of the present invention.

The linear polymers described above may be moulded by known methods, and cast into films and sheets. Those which are suitably crystalline can be spun into fibres and the fibres can be oriented by known methods, such as drawing. The properties of the polymers can be varied by varying the nature of the substituent groups on the carbon atoms of the polymer chain; thus when X and Y stand for —Cl the polymer is highly crystalline, possesses very low solubility at room temperature, is non-inflammable, possesses good electrical insulating properties and is fibre-forming. The chlorine groups in the side chain are remarkably inert. When X=Cl and Y=O.CO.CH$_3$ the polymer is a hard clear resin and when X and Y stand for —CH$_3$ the polymer is a low melting inert crystalline wax.

The invention is illustrated but not limited by the following examples in which the parts are by weight.

*Example 1*

5 parts of 3:3-bis-chloromethyloxacyclobutane having the formula

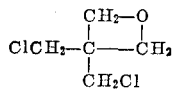

are treated with varying amounts of freshly distilled boron trifluoride diethyl etherate at room temperature. Using 0.56 part of the catalyst, there is an immediate reaction with evolution of heat to yield a viscous liquid which crystallizes on cooling. Using 0.028 part of the catalyst the reaction starts after 5 minutes. Using intermediate amounts of catalyst intermediate induction periods are observed. The products are hard, white or slightly coloured crystalline solids. On heating the products at 197° C. at 15 mm. for 30 minutes 2–6% of unchanged monomer is removed and the resulting product is harder.

*Example 2*

60 parts of 3:3-bis-chloromethyl-oxacyclobutane are treated with 0.34 part of boron trifluoride diethyl etherate. A white solid is obtained which on heating for 50 minutes at 197° C. and 15 mm. gives a hard white crystalline solid, softening point 180° C., melt viscosity 310 poises at 180° C. and 150 poises at 197° C. The molten polymer can be spun into filaments which can be oriented by drawing into fibres showing a well-ordered X-ray fibre diagram. It is insoluble in organic solvents at room temperature. It is capable of burning in a non-luminous flame but on removal from the flame immediately ceases to burn. The polymer can be moulded and has good electrical insulating properties as well as resistance to chemical attack, e.g., by aqueous bases and acids.

*Example 3*

12.72 parts of 3:3-bis-chloromethyl-oxacyclobutane dissolved in 25 parts of dry methylene dichloride are treated with 2.25 parts of boron trifluoride diethyl etherate. The mixture boils and deposits a white solid, M.P. 180° C. and which gives a viscous liquid on melting. Benzene or ether may be used as solvent in place of the methylene dichloride.

*Example 4*

On treatment with traces of boron trifluoride as described in the previous examples, 3-chloromethyl-3-acetoxymethyl-oxacyclobutane polymerizes to a hard glossy resin; 3:3-bis-acetoxymethyl-oxacyclobutane polymerizes to a slightly softer resin.

The two oxacyclobutanes used in this example may be prepared as follows:

31 parts of 3:3-bis-chloromethyl-oxacyclobutane are mixed with 39.2 parts of anhydrous potassium acetate and the mixture is heated in an oil bath at 180° C. for 3¼ hours. On cooling the pasty product is extracted with dry ether, the ether is removed and the residue is distilled. The product, B.P. 130–150° C. at 14 mm., is fractionally distilled to yield two fractions, B.P. 42–44° C. at 0.05 mm. and 68° C. at 0.05 mm. The first fraction is redistilled, B.P. 120° C. at 13 mm. and yields pure 3-chloromethyl-3 - acetoxymethyl - oxacyclobutane. The second fraction is redistilled, B.P. 152° C. at 21 mm., and yields pure 3:3-bis-acetoxymethyl-oxacyclobutane.

*Example 5*

Treatment of 3-hydroxymethyl-3-chloromethyl-oxacyclobutane with traces of boron trifluoride diethyl etherate gives immediately a hard colourless insoluble resin.

The oxacyclobutane used in this example may be prepared as follows:

A solution of 1015 parts of pentaerythritol dichloride in 560 parts of ethyl alcohol is mixed with a solution of 325 parts of KOH in 1300 parts of ethyl alcohol. The resultant solution is heated until it boils and is then boiled under a reflux condenser with stirring for 5 minutes. A precipitate of potassium chloride is formed. The hot mixture is filtered, the residue is washed well with ethyl alcohol and the filtrate and washings are distilled to remove the alcohol; the residue is fractionally distilled to give 585 parts of a colourless liquid, B.P. 120° C. at 8 mm., and 139 parts of unchanged pentaerythritol dichloride containing traces of the first mentioned fraction. The first fraction is 3-hydroxymethyl-3-chloromethyl-oxacyclobutane.

*Example 6*

20 parts of isopropylidene-3:3-bis-hydroxymethyl-oxacyclobutane are treated with 0.125 part of boron trifluoride etherate when it rapidly polymerizes to a tough opaque polymer, M.P. 102° C. On treatment of the polymer (after crumbling into small pieces) with water for 2 days at room temperature, followed by grinding and further treatment with normal hydrochloric acid for 1 hour there is obtained a white highly crystalline powder, M.P. 220–250° C., which dissolves in m-cresol to give a highly viscous solution. The treatment with water and dilute acid removes acetone from the polymer as is shown by the presence of acetone in the water after contact with the polymer.

The polymer first produced has a repeating unit:

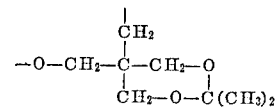

and after treatment with water and dilute acid has a repeating unit:

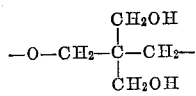

i.e., it is a linear high molecular weight polypentaerythritol.

The oxacyclobutane used in the above example may be prepared as follows:

A solution of 356 parts of pentaerythritol monochloride (which may be obtained by hydrolysis of 3-hydroxymethyl-3-chloromethyl-oxacyclobutane with boiling dilute sulphuric acid) in 1600 parts of acetone is treated with 25 parts of dry hydrogen chloride and the resultant solution is left to stand overnight. The solution is then stirred and anhydrous potassium carbonate is added until the solution is no longer acid. The mixture is filtered and the residue is washed with acetone. The filtrate and washings are distilled to remove acetone and the residue is fractionally distilled to yield 315 parts of a colourless liquid, B.P. 130–140° C. at 9 mm. This fraction is isopropylidene pentaerythritol monochloride,

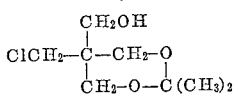

On treatment with one molecule of potassium hydroxide in ethyl alcohol (as in the preparation of 3-hydroxymethyl-3-chloromethyl-oxyacyclobutane from pentaerythritol dichloride) it yields isopropylidene-3:3-bis-hydroxymethyl-oxacyclobutane.

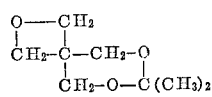

B.P. 40° C. at 0.15 mm.

*Example 7*

Treatment of 3:3-dimethyl-oxacyclobutane with traces of boron trifluoride diethyl etherate results in immediate and violent polymerization to give a white waxy and highly crystalline polymer, M.P. 47° C. The violence of the reaction may be moderated by adding the catalyst to the monomer while the monomer is maintained at −70° C. in a mixture of solid $CO_2$ and ethyl alcohol; polymerization then proceeds more slowly.

*Example 8*

13 parts of 3:3-bis-chloromethyl-oxacyclobutane and 8 parts of monofluorodichloromethane are placed in a flask under substantially anhydrous conditions. The solution is stirred and loss of monofluorodichloromethane is prevented by a reflux condenser using solid carbon dioxide-ethanol. 0.45 part of boron trifluoride is added with stirring and the solution is maintained at 0° C. by a cooling bath of ice and water. The stirrer is then removed. After 5½ hours the clear mobile solution has turned to a thick white paste. 5 parts of methanol in 30 parts of diethyl ether are added and the paste is stirred to mix it thoroughly. On filtration 10.25 parts of a white powder are obtained. Solid polymers so obtained melt to clear colourless liquids at 180°, possessing viscosities of 140–240 poises at 277°. They can be drawn into threads from the molten state and these threads are capable of "cold drawing."

*Example 9*

3.9 parts of 3:3-bis-chloromethyl-oxacyclobutane and 3 parts of isopropylidene-3:3-bis-hydroxymethyloxacyclobutane are mixed together and treated with 0.057 part of boron trifluoride etherate. The solution becomes hot and viscous and when cold it sets to a sticky resin, soluble in ethanol. On treatment with dilute hydrochloric acid it is no longer soluble in ethanol being converted to a rubbery polymer.

*Example 10*

13 parts of 3:3-bis-chloromethyl-oxacyclobutane (B.P. 30°/.02 mm.) are dried over calcium hydride and then distilled directly from the calcium hydride into a reaction vessel previously dried by heating with a flame whilst exhausted to a pressure of 0.03 mm. 24 parts of monofluorodichloromethane are also dried over calcium hydride, then distilled into the vessel by another connection. The solution is stirred magnetically and 0.23 part of boron trifluoride (dried over sodium) is passed in. After 6¼ hours 5 parts of methanol in 30 parts of diethyl ether are added and the white finely divided polymer is filtered off. 9 parts are obtained having melt viscosity 1100 poises at 210° C. and 240 poises at 277° C., M.P. 180° C.

*Example 11*

A solution of 25 parts of potassium metal and 31 parts of 3:3-bis-chloromethyl-oxacyclobutane in 120 parts of absolute ethanol is boiled for 20 hours and filtered. After removal of the ethanol by distillation, fractional distillation yields 23.7 parts of 3:3-bis-ethoxymethyloxacyclobutane, B.P. 81°–82° C. at 19 mmp. Analysis shows C 62.2%, H 9.9%. $C_9H_{18}O_3$ requires C 62.0, H 10.3%.

*Example 12*

A mixture of 77.5 parts of 3:3-bis-chloromethyloxacyclobutane and 146 parts of dry potassium phenate is heated for 4 hours in an oil bath at 150°–160° C. and the product is extracted with ether. The extract is filtered and the solvent and some phenol are removed by vacuum distillation. Fractional distillation yields 91.2 parts of colourless solid, B.P. 140°–159° C. at 0.04–0.05 mmp., which after two recrystallizations from methanol gives 63.3 parts of 3:3-bis-phenoxymethyloxacyclobutane, M.P. 68° C. Analysis shows C 75.7%, H 6.6%.

$$C_{17}H_{18}O_3$$

requires C 75.5, H 6.7%.

*Example 13*

To a solution of 7.3 parts of 3:3-bis-ethoxymethyl-oxacyclobutane, dried by distillation from sodium at 29° C. and 0.04–0.06 mmp. in 6.4 parts of monofluorodichloromethane, dried by passage over sodium hydroxide and calcium chloride, is added 0.11 part of boron trifluoride etherate. The mixture is agitated and boiled for 24 hours under substantially anhydrous conditions. 20 parts of methanol are then added and after standing overnight the mixture is finely ground and then filtered and the solid product is washed with 80 parts of methanol to give 6.6 parts of a colourless non-crystalline solid, M.P. 81°–85° C., insoluble in water, slightly soluble in methanol and ethanol and easily soluble in glacial acetic acid, ethyl acetate, ether, choloroform or benzene. The polymer has an inherent viscosity of 0.40, measured at 25° C. in a 0.5% solution in o-dichlorbenzene.

*Example 14*

To a solution of 6.0 parts of 3:3-bis-phenoxymethyl-oxacyclobutane (dried for 5 hours over phosphorus pentoxide in vacuo at 66° C.) in 4.8 parts of monofluorodichloromethane dried by passage over sodium hydroxide and calcium chloride, is added 0.11 part of boron trifluoride etherate. The mixture is shaken and boiled for 24 hours under substantially anhydrous conditions. 20 parts of methanol are then added and after standing for 48 hours the rubber-like mass is removed and treated with 40 parts of methanol for another 48 hours before collecting and drying. 5.8 parts of a colourless resin is obtained, M.P. 85–95° C., insoluble in water, acetic acid, methanol, ethanol or petroleum but soluble in ethyl acetate, chloroform or benzene and slightly soluble in ether. The polymer has an inherent viscosity of 0.40, measured at 25° C. in a 0.5% solution in o-dichlorobenzene.

What I claim is:

1. Process for the manufacture of high molecular weight polymeric substances which comprises contacting at least one oxacyclobutane in the absence of water with a Friedel-Crafts catalyst at a temperature of from −80° to 150° C.

2. A process according to claim 1 wherein the catalyst is selected from the group consisting of boron trifluoride and complexes thereof.

3. The process of preparing a copolymer of a 3,3-disubstituted oxetane, which comprises copolymerizing a mixture of at least two 3,3-disubstituted oxetanes capable of being polymerized by boron trifluoride, in the presence of a Friedel-Crafts polymerization catalyst at a temperature of from −80° C. to about 80° C.

4. The process of preparing a homopolymer of a 3,3-bis(chloromethyl)-oxetane, which comprises homopolymerizing said oxetane in the presence of a Friedel-Crafts polymerization catalyst at a temperature of from −80° C. to about 80° C.

5. The method for the preparation of synthetic resins, which comprises contacting a material consisting essentially of

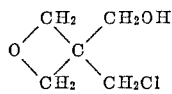

with a Friedel-Crafts catalyst at about room temperature, allowing the reaction to proceed, and recovering the resinous condensation product formed.

6. The method for the preparation of synthetic resins which comprises contacting a material consisting essentially of

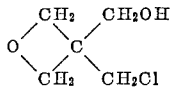

with a Friedel-Crafts catalyst at a temperature at which polymerization of said material will occur, allowing the reaction to proceed, and recovering the resinous condensation product formed.

7. The process of preparing a homopolymer of a 3,3-disubstituted oxetane, wherein any hydrogen present in the substituents in such 3-position is directly attached to carbon, which comprises homopolymerizing said oxetane in the presence of a Friedel-Crafts polymerization catalyst at a temperature of from −80° C. to about 80° C.

8. A homopolymer of a 3,3-disubstituted oxetane having more than twenty-repeating units in the polymer chain, said 3,3-disubstituted oxetane having the formula:

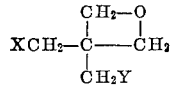

wherein X is selected from the class consisting of hydrogen, halogen, cyanide, hydroxyl, alkoxy, phenoxy and acyloxy groups and Y is selected from the class consisting of hydrogen, halogen, cyanide, alkoxy, phenoxy and acyloxy groups.

9. A homopolymer of 3,3-bis(chloromethyl)-oxetane having more than twenty repeating units in the polymer chain.

10. A copolymer of at least two 3,3-disubstituted oxetanes having more than twenty repeating units in the polymer chain, said 3,3-disubstituted oxetanes having the formula:

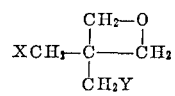

wherein X is selected from the class consisting of hydrogen, halogen, cyanide, hydroxyl, alkoxy, phenoxy and acyloxy groups and Y is selected from the class consisting of hydrogen, halogen, cyanide, alkoxy, phenoxy and acyloxy groups.

11. A homopolymer of 3,3-bis(chloromethyl)-oxetane having more than twenty repeating units in the polymer chain, said homopolymer being further characterized by its film- and fiber-forming properties, a well-ordered X-ray diagram when spun and drawn and a softening point of about 180° C.

12. A high molecular weight polymer selected from the group consisting of linear and cross-linked polymers of oxacyclobutanes having the formula:

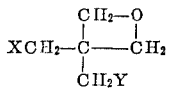

wherein X is selected from the class consisting of hydrogen, halogen, cyanide, hydroxyl, alkoxy, phenoxy and acyloxy groups and Y is selected from the class consisting of hydrogen, halogen, cyanide, alkoxy, phenoxy and acyloxy groups, said polymer having more than twenty repeating units in the polymer chain.

13. A shaped polymeric product selected from the group consisting of films and fibers formed from a high molecular weight polymer of claim 12.

14. A high molecular weight polymer of oxacyclobutane, said polymer being composed of more than twenty repeating units of the formula:

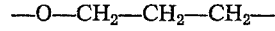

References Cited in the file of this patent

UNITED STATES PATENTS

| | | |
|---|---|---|
| 2,462,048 | Wyler | Feb. 15, 1949 |
| 2,722,520 | Hulse | Nov. 1, 1955 |

FOREIGN PATENTS

| | | |
|---|---|---|
| 477,843 | Great Britain | Jan. 3, 1938 |

OTHER REFERENCES

Fonteyne et al.: C.A., volume 38, page 5216.